US010499456B1

(12) United States Patent
Branlund et al.

(10) Patent No.: US 10,499,456 B1
(45) Date of Patent: Dec. 3, 2019

(54) DISTRIBUTED CAPACITY BASE STATION ARCHITECTURE FOR BROADBAND ACCESS WITH ENHANCED IN-BAND GPS CO-EXISTENCE

(71) Applicant: Tarana Wireless, Inc., Santa Clara, CA (US)

(72) Inventors: Dale Branlund, Portola Valley, CA (US); Sergiu Nedevschi, El Cerrito, CA (US); Omar Bakr, Berkeley, CA (US)

(73) Assignee: TARANA WIRELESS, INC., Santa Clara, CA (US)

( * ) Notice: Subject to any disclaimer, the term of this patent is extended or adjusted under 35 U.S.C. 154(b) by 0 days.

(21) Appl. No.: 13/843,399

(22) Filed: Mar. 15, 2013

(51) Int. Cl.
*H04W 16/14* (2009.01)
*H04W 84/06* (2009.01)
*H04W 88/08* (2009.01)

(52) U.S. Cl.
CPC ............ *H04W 88/08* (2013.01); *H04W 16/14* (2013.01); *H04W 84/06* (2013.01)

(58) Field of Classification Search
CPC ...... H04W 88/08; H01Q 1/246; H04L 1/0618
USPC ............ 455/456.5, 560, 561, 562.1; 370/334
See application file for complete search history.

(56) References Cited

U.S. PATENT DOCUMENTS

| | | |
|---|---|---|
| 6,122,260 A | 9/2000 | Liu et al. |
| 6,219,561 B1 | 4/2001 | Raleigh |
| 6,289,062 B1 | 9/2001 | Wang et al. |
| 6,580,328 B2 | 6/2003 | Tan et al. |
| 6,771,985 B1 | 8/2004 | Iinuma |
| 6,795,424 B1 | 9/2004 | Kapoor et al. |
| 6,865,169 B1 | 3/2005 | Quayle et al. |
| 7,003,310 B1 | 2/2006 | Youssefmir et al. |
| 7,054,292 B2 | 5/2006 | Hall et al. |
| 7,155,183 B2 | 12/2006 | Abraham |
| 7,333,455 B1 | 2/2008 | Bolt et al. |
| 7,340,279 B2 | 3/2008 | Chen et al. |
| 7,366,120 B2 | 4/2008 | Handforth et al. |
| 7,469,152 B2 | 12/2008 | Cetiner et al. |
| 7,493,129 B1 * | 2/2009 | Mostafa et al. ............ 455/502 |
| 7,502,355 B2 | 3/2009 | Bednekoff et al. |
| 7,567,543 B2 | 7/2009 | Cao et al. |
| 7,603,081 B2 | 10/2009 | Karabinis |
| 7,636,552 B2 | 12/2009 | Monk |
| 7,640,020 B2 | 12/2009 | Gutowski |
| 7,646,752 B1 | 1/2010 | Periyalwar et al. |
| 7,688,739 B2 | 3/2010 | Frei et al. |

(Continued)

FOREIGN PATENT DOCUMENTS

| | | |
|---|---|---|
| EP | 2071745 | 2/2011 |
| GB | 2350265 | 11/2000 |

(Continued)

OTHER PUBLICATIONS

"Adaptive Frequency-Domain Equalization and Diversity Combining for Broadband Wireless Communications" by Martin V. Clark; IEEE Journal; dated Oct. 1998.

(Continued)

*Primary Examiner* — San Htun
(74) *Attorney, Agent, or Firm* — DLA Piper LLP (US)

(57) ABSTRACT

A distributed capacity base station system and method are disclosed. The system may provide a cost effective, high capacity broadband wireless access solution that can co-exist with GPS without interference to the GPS system.

7 Claims, 7 Drawing Sheets

Distributed Capacity BTS Architecture

(56) References Cited

U.S. PATENT DOCUMENTS

| | | |
|---|---|---|
| 7,720,444 B2 | 5/2010 | Darabi et al. |
| 7,839,856 B2 | 11/2010 | Sinha et al. |
| 7,953,389 B2 | 5/2011 | Coleman et al. |
| 8,195,224 B2 | 6/2012 | Saban et al. |
| 8,238,318 B1 | 8/2012 | Kegus |
| 8,340,235 B2 | 12/2012 | Mohammad et al. |
| 8,416,872 B2 | 4/2013 | Higuchi et al. |
| 8,488,728 B2 | 7/2013 | Mohammad et al. |
| 8,502,733 B1 | 8/2013 | Negus et al. |
| 8,531,471 B2 | 9/2013 | Chen et al. |
| 8,654,815 B1 | 2/2014 | Forenza et al. |
| 8,670,390 B2 | 3/2014 | Shattil |
| 8,811,348 B2 | 8/2014 | Rangan et al. |
| 8,837,305 B2 | 9/2014 | Nanda et al. |
| 9,124,381 B2 | 9/2015 | Karabinis et al. |
| 9,131,529 B1 | 9/2015 | Ayyagari et al. |
| 9,252,908 B1 | 2/2016 | Branlund |
| 9,325,409 B1 | 4/2016 | Branlund |
| 9,332,465 B2 | 5/2016 | Valliappan et al. |
| 9,356,358 B2 | 5/2016 | Chang et al. |
| 9,386,465 B2 | 7/2016 | Forenza et al. |
| 9,456,354 B2 | 9/2016 | Branlund |
| 9,502,022 B2 | 11/2016 | Chang et al. |
| 9,735,940 B1 | 8/2017 | Bakr et al. |
| 9,819,083 B1 | 11/2017 | Chen et al. |
| 9,853,668 B2 | 12/2017 | Corbalis et al. |
| 9,854,408 B2 | 12/2017 | Suthar et al. |
| 9,923,657 B2 | 3/2018 | Forenza et al. |
| 9,973,246 B2 | 5/2018 | Forenza et al. |
| 10,056,963 B1 | 8/2018 | Au |
| 10,164,698 B2 | 12/2018 | Forenza et al. |
| 2001/0028675 A1 | 10/2001 | Bierly |
| 2002/0042290 A1 | 4/2002 | Williams et al. |
| 2003/0035468 A1 | 2/2003 | Corbaton et al. |
| 2004/0142701 A1* | 7/2004 | Abraham ............. G01S 19/235 455/456.1 |
| 2004/0192199 A1* | 9/2004 | Eade ................... G01S 19/235 455/12.1 |
| 2005/0078038 A1* | 4/2005 | Takaki ................. H01Q 1/243 343/702 |
| 2005/0141624 A1 | 6/2005 | Lakshmipathi et al. |
| 2005/0245192 A1* | 11/2005 | Karabinis ............. H04B 1/006 455/12.1 |
| 2006/0119440 A1 | 6/2006 | Isobe et al. |
| 2006/0135070 A1* | 6/2006 | Karabinis ............... 455/63.1 |
| 2006/0268769 A1 | 11/2006 | Pan |
| 2006/0292990 A1* | 12/2006 | Karabinis ........... H01Q 3/2611 455/63.4 |
| 2007/0087690 A1* | 4/2007 | Karabinis ......... H04B 7/18515 455/12.1 |
| 2008/0117101 A1* | 5/2008 | Pan ..................... G01C 21/206 342/357.23 |
| 2008/0130496 A1 | 6/2008 | Kuo et al. |
| 2008/0214196 A1 | 9/2008 | Sambhwani |
| 2008/0214218 A1 | 9/2008 | Lakshmanan |
| 2008/0233967 A1 | 9/2008 | Montojo et al. |
| 2008/0247388 A1 | 10/2008 | Horn |
| 2008/0261602 A1 | 10/2008 | Livneh |
| 2008/0278394 A1* | 11/2008 | Koh et al. ..................... 343/754 |
| 2008/0317014 A1 | 12/2008 | Veselinovic et al. |
| 2009/0110033 A1 | 4/2009 | Shattil |
| 2009/0310693 A1 | 12/2009 | Baker et al. |
| 2009/0316675 A1 | 12/2009 | Malladi |
| 2010/0035620 A1 | 2/2010 | Naden et al. |
| 2010/0046595 A1 | 2/2010 | Sikri et al. |
| 2010/0056059 A1 | 3/2010 | Lakshmanan et al. |
| 2010/0067476 A1 | 3/2010 | Periyalwar et al. |
| 2010/0087149 A1 | 4/2010 | Srinivasan et al. |
| 2010/0093391 A1* | 4/2010 | Saban ................... H04B 7/024 455/552.1 |
| 2010/0195619 A1 | 8/2010 | Bonneville et al. |
| 2010/0215032 A1 | 8/2010 | Jalloul et al. |
| 2010/0248644 A1 | 9/2010 | Kishi et al. |
| 2010/0254295 A1 | 10/2010 | Ahn et al. |
| 2010/0296459 A1 | 11/2010 | Miki et al. |
| 2011/0034200 A1 | 2/2011 | Leabman |
| 2011/0039509 A1 | 2/2011 | Bruchner |
| 2011/0051731 A1 | 3/2011 | Mang et al. |
| 2011/0075601 A1 | 3/2011 | Zheng |
| 2011/0105054 A1 | 5/2011 | Cavin et al. |
| 2011/0269410 A1 | 11/2011 | Tsujimoto et al. |
| 2011/0274032 A1 | 11/2011 | Leng et al. |
| 2012/0108257 A1 | 5/2012 | Kwon et al. |
| 2012/0129539 A1 | 5/2012 | Arad et al. |
| 2013/0044028 A1 | 2/2013 | Lea et al. |
| 2013/0094522 A1 | 4/2013 | Moshfeghi |
| 2013/0095747 A1 | 4/2013 | Moshfeghi |
| 2013/0142136 A1 | 6/2013 | Pi et al. |
| 2013/0207841 A1 | 8/2013 | Negus et al. |
| 2013/0237261 A1 | 9/2013 | Bazzi |
| 2013/0259113 A1 | 10/2013 | Kumar |
| 2014/0269492 A1 | 9/2014 | Forenza et al. |
| 2014/0269502 A1 | 9/2014 | Forenza et al. |
| 2015/0124713 A1 | 5/2015 | Salhov et al. |
| 2015/0244458 A1 | 8/2015 | Erkmen |
| 2016/0119052 A1 | 4/2016 | Frerking |
| 2016/0255605 A1 | 9/2016 | Kyeong et al. |
| 2017/0013476 A1 | 1/2017 | Suthar et al. |
| 2018/0249453 A1 | 8/2018 | Nagaraja et al. |
| 2018/0262936 A1 | 9/2018 | Zhou et al. |
| 2018/0279316 A1 | 9/2018 | Mueck et al. |
| 2018/0287833 A1 | 10/2018 | Kennedy |
| 2019/0068235 A1 | 2/2019 | Branlund et al. |

FOREIGN PATENT DOCUMENTS

| | | |
|---|---|---|
| JP | 2010-522516 | 7/2010 |
| JP | 2010-525678 | 7/2010 |
| JP | 2010-183573 | 8/2010 |
| WO | 9820633 | 5/1998 |
| WO | 0205493 | 1/2002 |
| WO | 02063896 | 8/2002 |
| WO | 2005101882 | 10/2005 |
| WO | 2007082142 | 7/2007 |
| WO | 2008033369 | 3/2008 |
| WO | 2009119463 | 10/2009 |
| WO | 2010003509 | 1/2010 |
| WO | 2010013245 | 2/2010 |
| WO | 2012037643 | 3/2012 |

OTHER PUBLICATIONS

"The Bits and Flops of the N-hop Multilateration Primitive for Node Localization Problems" by Andreas Savvides et al.; UCLA; dated Sep. 28, 2002.

"Echo Cancellation and Channel Estimation for On-Channel Repeaters in DVB-T/H Networks" by Karim M. Nasr et al.; Brunel University; dated after Jan. 2006.

"Load- and Interference-Aware Channel Assignment for Dual-Radio Mesh Backhauls" by Michelle X. Gong et al.; IEEE Communications Society; dated 2008.

"Signal Acquisition and Tracking with Adaptive Arrays in the Digital Mobile Radio System IS-54 with Flat Fading" by Jack H. Winters; IEEE Transactions; dated Nov. 4, 1993.

* cited by examiner

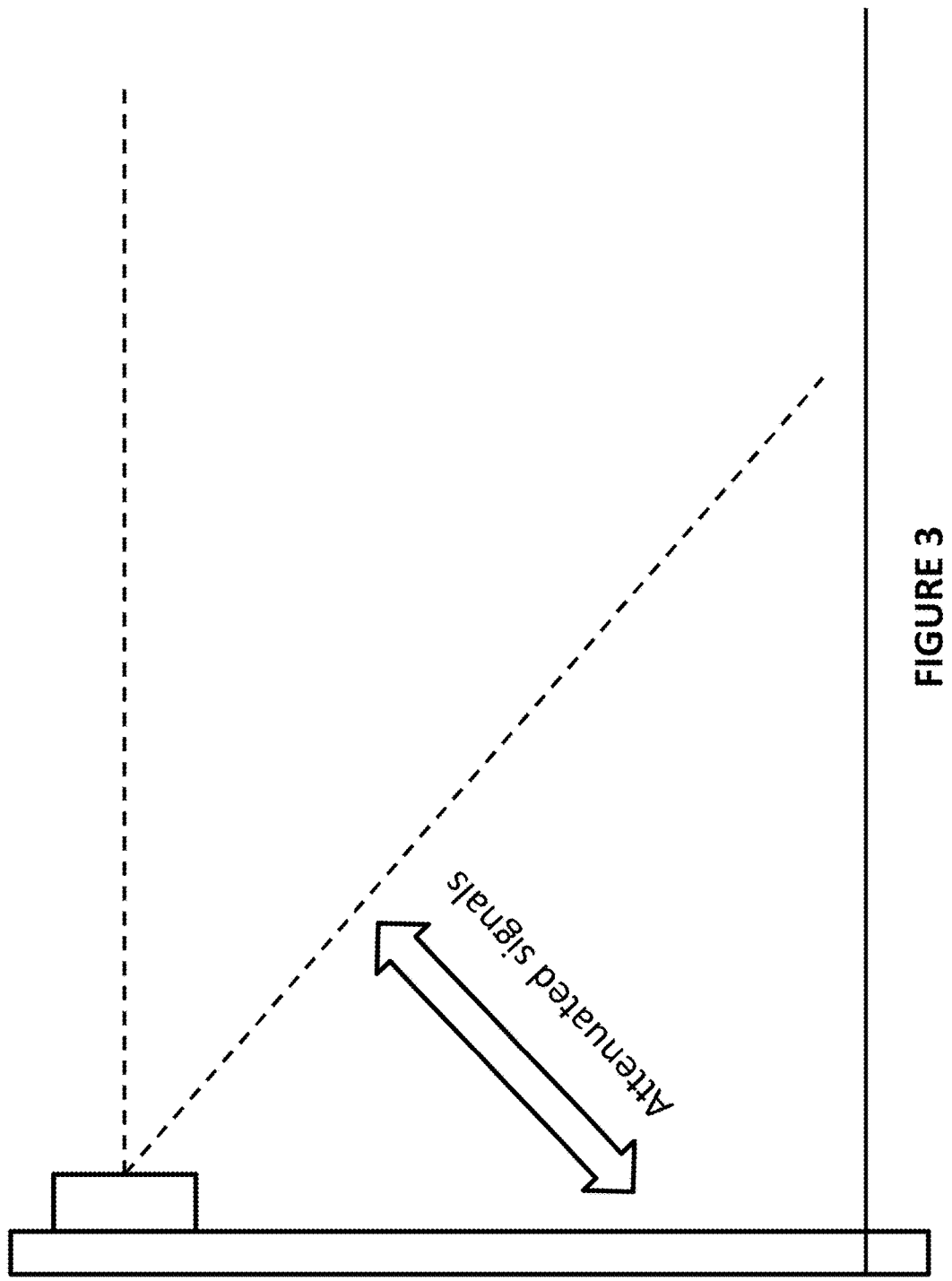

DISTRIBUTED CAPACITY BASE STATION ARCHITECTURE FOR BROADBAND ACCESS WITH ENHANCED IN-BAND GPS CO-EXISTENCE

FIELD

The disclosure relates generally to wireless communications systems and in particular to a base station for use in a wireless communications system.

BACKGROUND

The final report of the Federal Communications Commission (FCC)-mandated Technical Working Group (TWG) clearly and conclusively demonstrated that the ground-based cellular network deployment proposed by LightSquared at the time the TWG was formed would cause devastating interference to millions of GPS users. The 1,000-plus page TWG final report, submitted to the FCC on Jun. 30, 2011, was based on extensive testing and analysis by sub-groups of different types of GPS users, including Aviation, Cellular, General Navigation & Location, High Precision GPS, Timing and Networks, and Space based GPS. The tests of more than 100 different GPS devices were very carefully conducted—in the laboratory, anechoic chamber and in "live sky" test environments—with more than 100 engineers, technical experts and advisors participating in the study and preparation of the final report.

The proposed Lightsquared broadband access system, comprised of macro base stations (BTS) and client devices, featured $4^{th}$ generation LTE BTSs (4G) based on Orthogonal frequency-division multiple access (OFDMA), adaptive modulation and so-called smart antenna techniques such as multiple input and multiple output (MIMO) systems. The proposed system would operate in 10 MHz of spectrum between 1525 MHz and 1535 MHz for the BTS downlink. The system is adjacent to the GPS band centered at 1575 MHz. The equivalent isotropically radiated power (EIRP) generated by the broadband access system enters the GPS antenna and causes brute force overload of the low noise amplifier (LNA) and $1^{st}$ mixer in the GPS receiver chain disabling the timing and navigation functions. Note that GPS receivers, particularly those serving the commercial marketplace use little if any RF filtering. Effective filtering would reduce or eliminate this problem, yet millions of the GPS receivers are deployed today in cell phones and car navigation computers.

Due to this interference problem, the LightSquared system failed to achieve FCC approval for deployment of the ATC BWA network. This is proof of the severity of GPS brute force overload and the need for the technology described herein to solve this problem. Absent a solution, the L band spectrum is render useless for BWA applications.

BRIEF DESCRIPTION OF THE DRAWINGS

FIG. 3 illustrates an effect of an antenna design of the radio access node of the distributed capacity base station broadband wireless access system;

DETAILED DESCRIPTION OF ONE OR MORE EMBODIMENTS

Figures 1, 2:
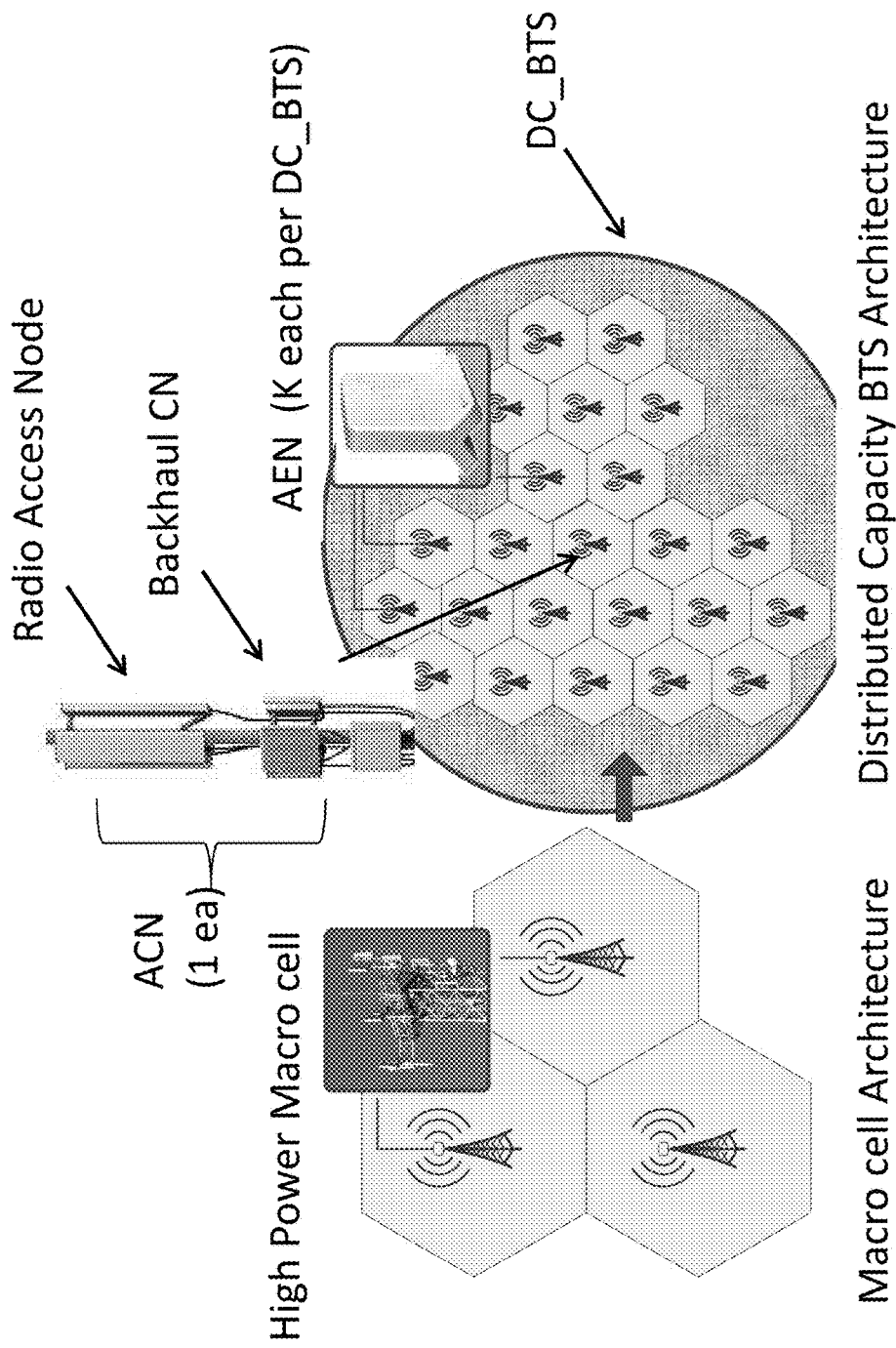
FIG. 1 is a typical broadband wireless access system with high power macro cells.
FIG. 2 is a distributed capacity base station broadband wireless access system.

The disclosure is particularly applicable to a 3G or 4G broadband access system that can co-exist with a GPS system and it is in this context that the disclosure is made. However, the system and method may be used for other broadband wireless access systems in which it is desirable to be able to operate without interfering with a global positioning system (GPS). Moreover, the capacity, coverage and and other technical and economic merits of the invention are compelling such that it maybe considered as the broadband access system for other frequency bands where there is no danger of interfering with GPS.

In one embodiment, the system may be a 4G broadband access (BWA) system that uses a low power radio access node (RAN). The RAN is able to co-exist with other systems, such as GPS, since its lower EIRP, novel antenna design and power management techniques prevent brute force overload (BFO) of the GPS receiver with very high probability.

The use a low EIRP RAN allows for interference free co-existence and the prevention of BFO in GPS receivers. However, low EIRP reduces cellular coverage area, requiring a much greater number of RANs with associated backhaul. At some point, the wireless architecture becomes cost prohibitive because the equipment cost is too high, and/or backhaul is either not available or is too expensive to deploy at this scale. Thus, the system also provides a cost effective BWA architecture to solve this problem based on a distributed base station concept. Thus, the system is a cost effective, high capacity BWA solution that can co-exist with GPS without BFO/interference to the GPS system based on a novel distributed capacity base stations (DC_BTS) architecture.

The DC_BTS architecture is suitable for $4^{th}$ generation and beyond broadband wireless access (BWA). The capacity and capacity density of this architecture increases network performance by 10 times compared to commercial 3G and 4G wireless infrastructure. This enables higher speed, higher performance and greater tonnage for next generation client devices including smart phones, tablet computers, and other high capacity devices. Moreover, the architecture facilitates lower power transmissions (e.g. 20 dB less power compared to the Lightsquared macro-cell) thus lowering power consumption and operational expense.

In the system, low power RAN transmitters, antenna pattern shaping and power management are designed so that the "shaped" RAN EIRP footprint is low enough so as not to overload other in-band receivers (like GPS receivers) operating in adjacent frequency bands. In particular, the transmitter EIRP of the RAN may fall within an RF preselection bandwidth of the front end receive filter. In this case, the transmitter EIRP may overload the LNA and/or the $1^{st}$ mixer causing "brute force overload" (BFO). BFO is caused by the non-linearity in the frontend RF devices and can severely reduce receiver performance or cause total failure of the receiver. An exemplary illustration of this principle is the operation of a BWA system in the RF channels adjacent to the GPS band. The recent failure of LightSquared to achieve FCC approval for deployment of the BWA ATC network is testimony to GPS brute force overload and the need for the technology described herein.

FIG. 1 is a typical broadband wireless access system 10 with high power macro cells 12. Each macro cell has a large geographic area since the base station 14 in each macro cell is a high power base station. The problem with this broadband wireless access system 10 is that each base station 14 equivalent isotropically radiated power (EIRP) is so high that it will cause the brute force overload of a GPS receiver if the GPS receiver is using an adjacent spectrum. Thus, it is not possible for the system 10 to co-exist with a GPS system that is using an adjacent spectrum. However, a distributed capacity base station broadband wireless access system can overcome that problem and be able to co-exist with a GPS system in an adjacent spectrum.

FIG. 2 is a distributed capacity base station broadband wireless access system 20 (DC_BTS.) In the distributed capacity base station broadband wireless access system 20, each base station is smaller and thus has less EIRP so that the distributed capacity base station broadband wireless access system 20 can co-exist with a GPS system in an adjacent spectrum. As a result, each cell 22 in the distributed capacity base station broadband wireless access system 20 has a smaller geographic area.

The distributed capacity base station broadband wireless access system 20 may include two different types of network elements that may include one or more Access Concentrating Nodes (ACNs) 24 and one or more Access End Node (AEN) 30. Taken as a whole, they achieve the performance of a base station with extended capacity, low and more uniform power density and deployment flexibility suitable for meeting growing capacity requirements while ensuring GPS co-existence. As shown in FIG. 2, in each cell, there may be a single ACN 24 but a plurality of AENs 30.

In more detail, each AEN 30 may further comprise a backhaul end node (EN) integrated with a radio access node (RAN) providing network access to a wireless link (A). Hence the term AEN is an integrated (physically or logically) network component. The ACN 24 may further include a backhaul concentrating node (CN) 28 integrated with a RAN 26 in a similar manner. As shown in FIG. 2, for the ACN 24, the two components of the ACN (the backhaul CN 28 and the RAN 26) may be installed at the same location.

The ACN 24 is a primary point of connectivity back to the core network. The combination of the EN and CN form the points of backhaul connectivity for the distributed capacity base station broadband wireless access system 20. In the system 20, the backhaul network may use backhaul links that may be fiber, copper, laser, microwave radio, millimeter wave radio, near link-of-sight radio (nLOS) or non-line-of-sight (NLOS) radio. The actual topology of the backhaul network can be various topologies and configurations such as a star topology, a ring topology, feeders and rings topology, etc. In one implementation of the system 20, the backhaul link may use non-line-of-sight radio. An example of a non-line-of-sight radio that may be used with the system 20 is disclosed in copending patent application Ser. Nos. 13/445,863, 13/445,869 and 13/445,861 all of which were filed on Apr. 12, 2012 and the disclosure of each of which is incorporated herein by reference.

Figure 7:
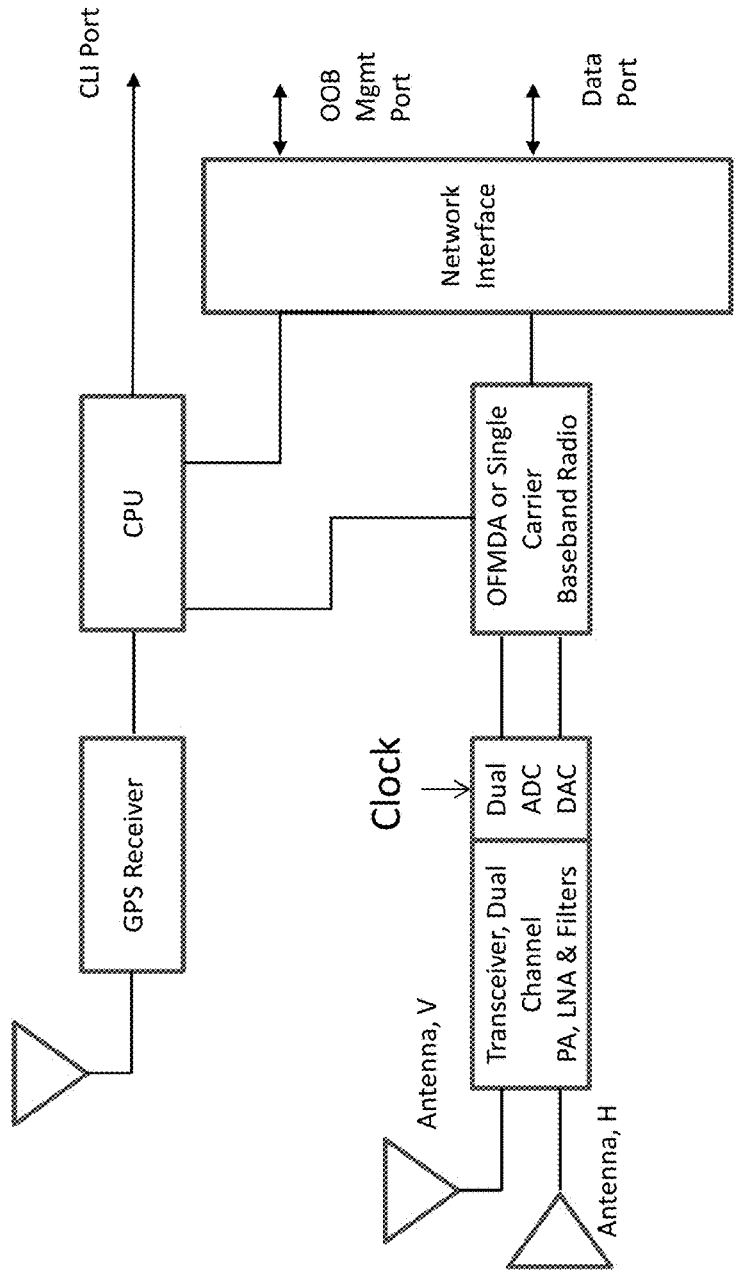
FIG. 7 is a block diagram of a radio access node.
Figure 8:
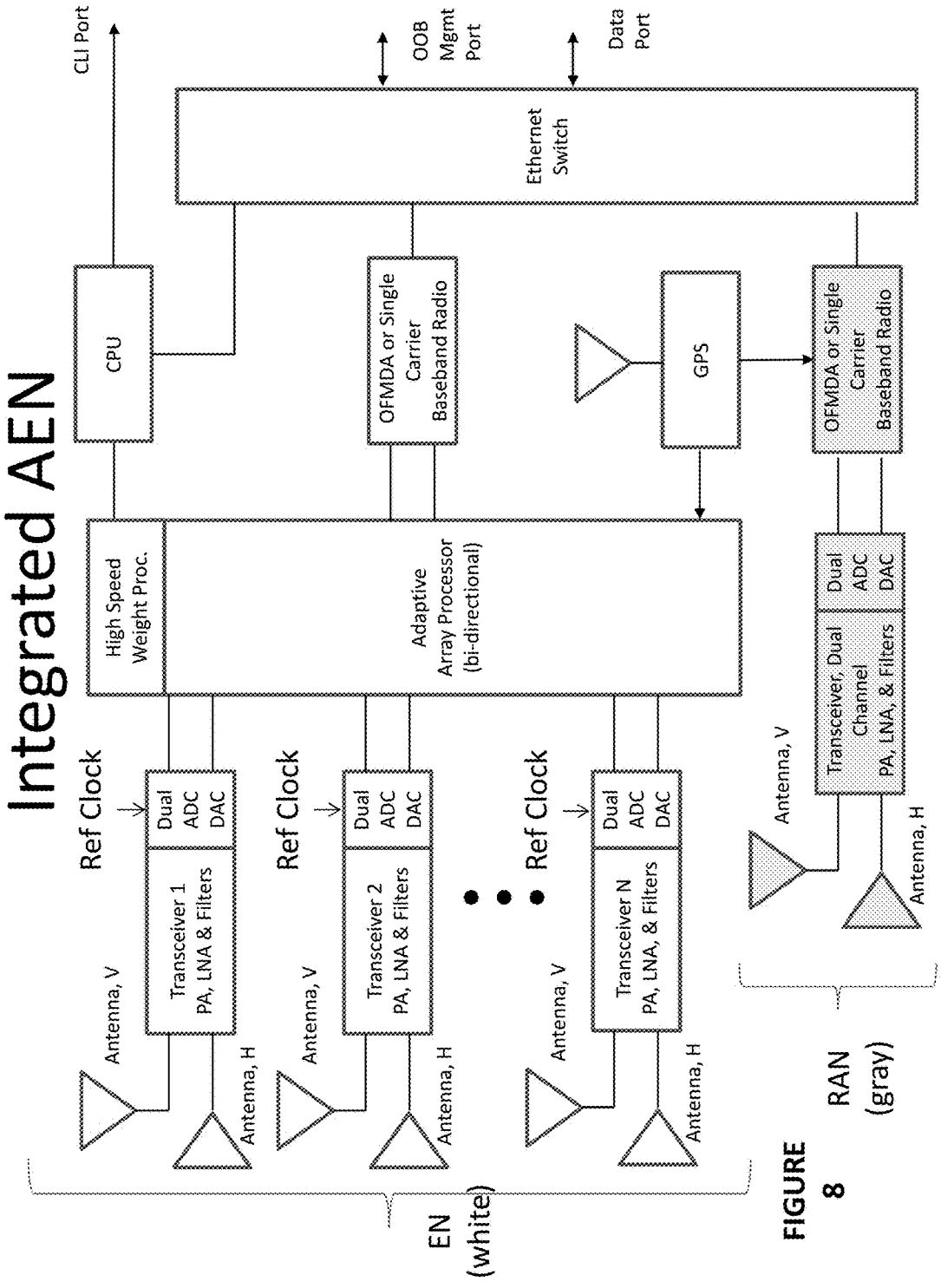
FIG. 8 is an integrated AEN.

The RAN 26 (for both the ACN and AEN) has a number of technologies to minimize "coupled" EIRP. First, the in-beam EIRP for each RAN is limited to 42 decibels milliwatts isotropic (dBmi). This is approximately 21 dB lower than the Lightsquared design such as shown in FIG. 1. While this dramatically reduces cell area due to the lower power, it significantly improves GPS co-existence. A block diagram of the RAN 26 is in FIG. 7.

Figure 6:
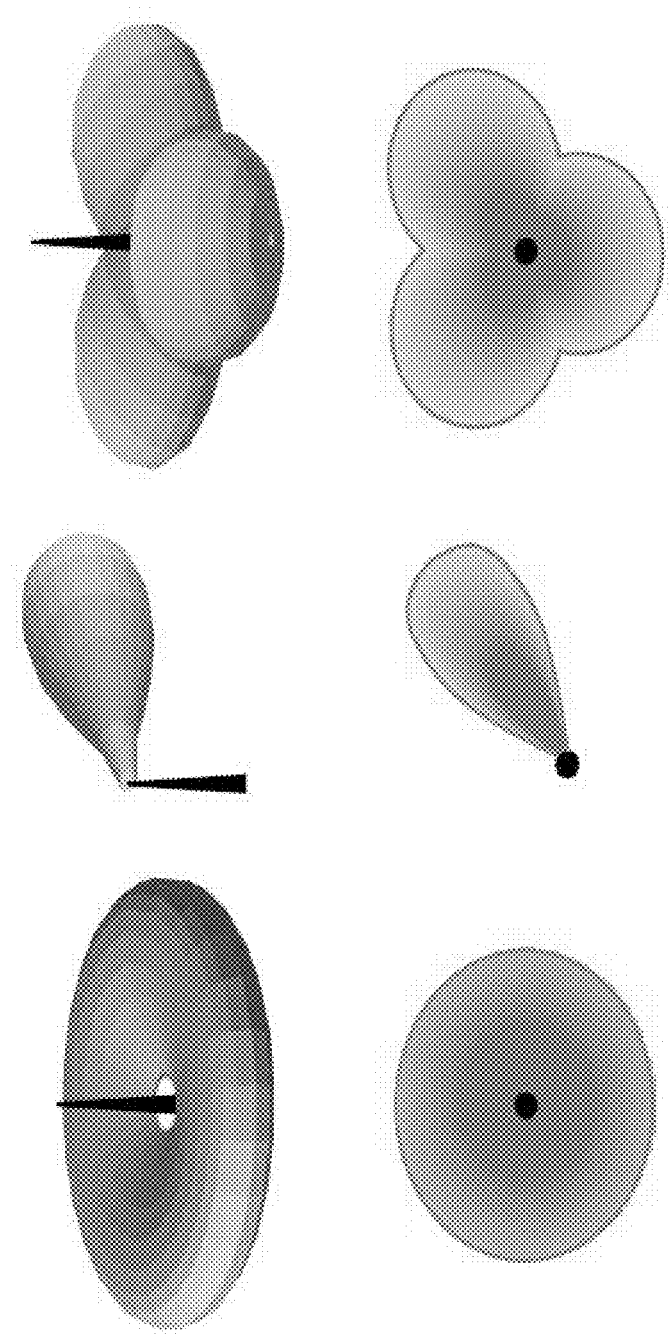
FIG. 6 illustrates examples of shaped antenna patterns for suppression of transmitter power for close-in gps receivers.

The RAN may also have a novel antenna design that shapes the elevation pattern so that the EIRP footprint is attenuated 15 to 20 dB relative to the beam peak for depression angles from 45 to 90 degrees as shown in FIG. 3. FIG. 6 illustrates examples of antenna patterns. This attenuating further reduces the EIRP for GPS receivers near or under the RAN antenna when the RAN antenna is elevated above street level as it typically is.

The RAN may also a peak-to-average power reduction (PAPR), modulation and coding scheme (MCS) downshifting, and polarization preference scheduling (PPS) that also allow the system to co-exist with the GPS system in an adjacent spectrum. The PAPR effectively reduces the peak power "seen" by the GPS thus reducing the effects of BFO. Modern PAPR reduction techniques show a reduction of 3 to 5 dB relative the peak power of an OFDM waveform. MCS downshifting recognizes that transmitting at the highest possible MCS level requires the highest transmit power. However, it may be perfectly acceptable to transmit at a lower MCS levels thus lower EIRP (3 to 6 dB lower as an example) while maintaining adequate link speed and low traffic queue depth. The MCS downshifting may be carried out by a controller/processor within the RAN. PPS recognizes that GPS receivers may be more or less susceptible to different polarizations. As an example, the known polarization of the GPS signal is Right Hand Circular so that RAN transmitters using left hand circuit (LHC) polarization are less likely to cause BFO due to the increase isolation inherent to the GPS antenna. Hence the RAN may schedule traffic primarily in the polarization with the least coupling to GPS. This adjustment may also be carried out by a processor/controller within the RAN.

The above is the RAN technology that best maximizes GPS co-existence, but note that the cell area has been significantly reduced in the process. In so doing, the cost of the network may not be feasible if the backhaul technology becomes the limiting factor. Hence, we describe the embodiment of the DC_BTS using NLOS radio links.

The DC_BTS uses a predetermined number, K. AEN nodes 30 and one ACN node 24 as shown in FIG. 2. Each node has a predetermined capacity, C, and thus each base station of the DC_BTS has a capacity K×C. Each AEN 30 is connected wirelessly to the ACN 24 via one or more up to a predetermined number K of beamformed links ("beams") as described in copending patent application Ser. Nos. 13/445,863, 13/445,869 and 13/445,861 all of which were filed on Apr. 12, 2012 and the disclosure of each of which is incorporated herein by reference. Each of these beams may operate on an independent RF channels or on the same RF channel per the method described in the patent applications incorporated by reference above. The broadband access components generally operate on a different frequency channel or in a different frequency bands.

Figure 4:
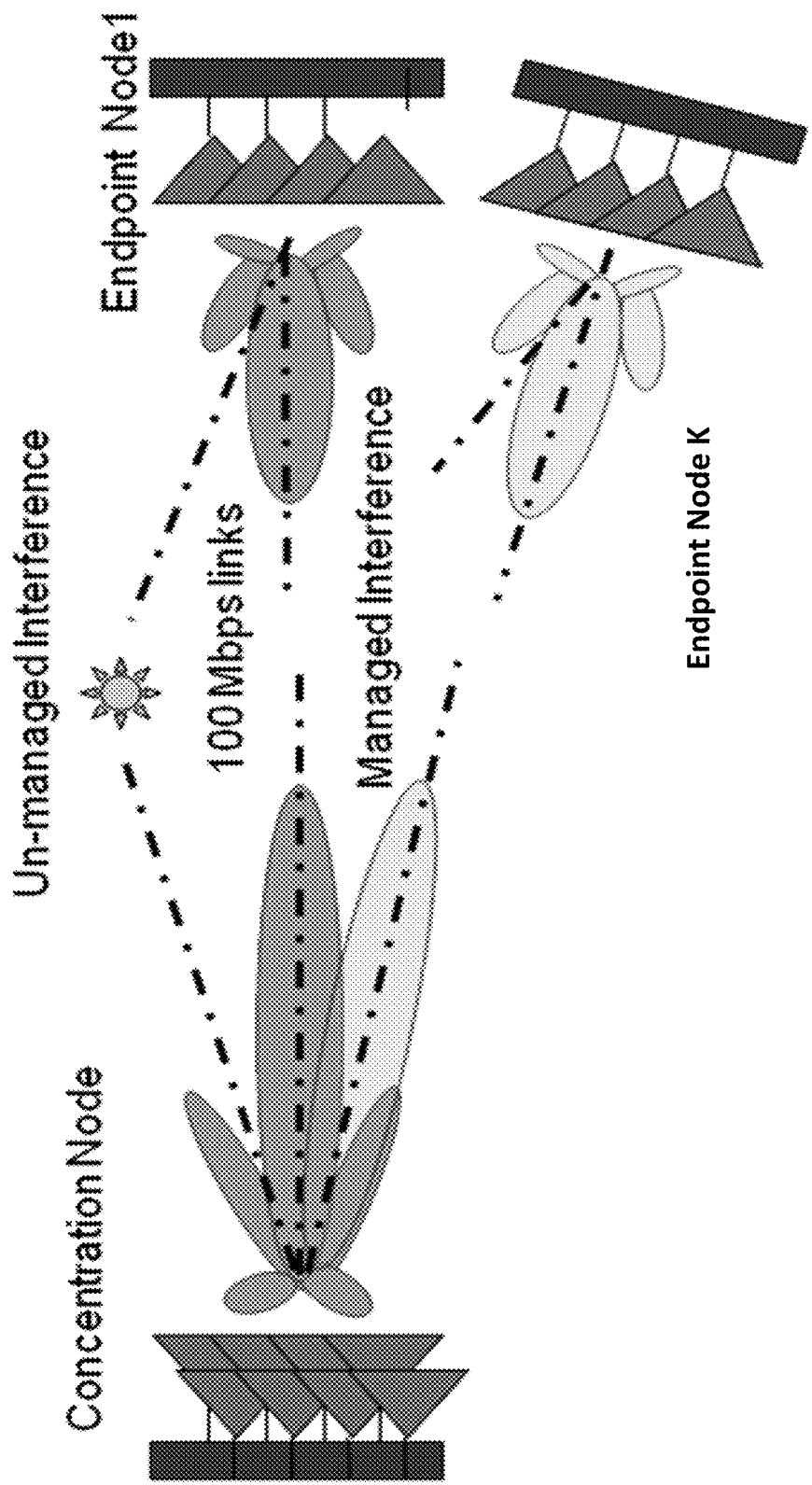
FIG. 4 illustrates more details of a distributed capacity base station broadband wireless access system.
Figure 5:
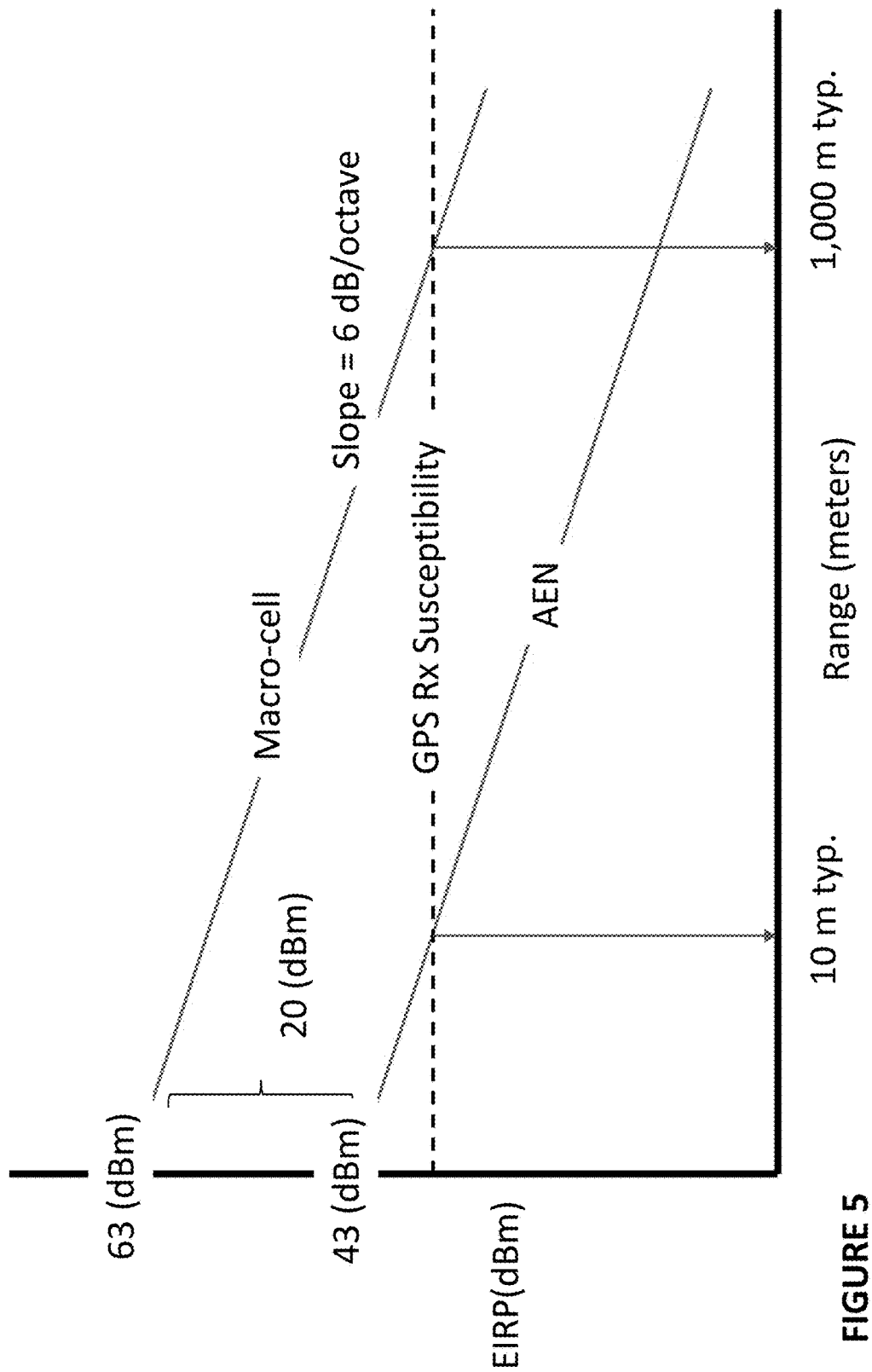
FIG. 5 is a diagram illustrating the performance of the distributed capacity base station broadband wireless access system.

The area covered by each base station is $(K+1)A_{SC}$ where $A_{SC}$ is the area covered by the embedded RAN 26. Note, that the area covered by the base station may be "split" by adding 2 to 3 ACNs and 2000 to 3000 AENs 30. This change increases capacity density by 3 to 4 times and is made possible via the co-channel interference cancellation (IC) properties of the wireless backhaul links as shown in FIG. 4. Note that the capacity density can be increased another 3 to 4 times by further "IC cell splitting", yielding a 9× to 12× increase in the capacity initially deployed.

The use of a single RF channel for the backhaul link is referred to as universal frequency reuse. During "co-channel IC cell splitting", the same channel is reused adhering to as universal frequency reuse principle.

The placement of AENs 30 within the DC_BTS footprint can be quite flexible. This feature ensures that the AENs 30 can be placed in traffic "hot-spots" or on convenient mounting locations such as light standards, traffic poles and building sides. Moreover, once the ACN is installed, capacity can be added anywhere within the footprint by simply adding the AENs. Thus, only one side of the link need be installed once the ACN is installed. In part, the AEN location flexibility is enabled by the true non-line-of-sight capability of the backhaul links described in more detail in the co-pending patent applications incorporated by reference above.

The cost of the DC_BTS compares favorably with the cost of conventional wireless infrastructure. This is due to the use of many low cost AENs 30 with a single, higher cost incurred at the ACN. Moreover, the expense of outdoor enclosures, towers, tower cabling, and civil works is dramatically reduced.

The distributed capacity base station broadband wireless access system 20 is compatible with all frequency division duplexing (FDD) and time division duplexing (TDD) 3G and 4G wireless standards for the radio access links. The architecture's functional partitioning supports different physical layers (L1 PHY) and media access controller (L2 MAC) with the layers each optimized for its intended purpose. Thus, the PHY and MAC can be optimized for mobility and standards compliance on the access links while the PHY and MAC are optimized for very high capacity on the fixed backhaul links.

An embodiment of the system 20 supports two levels of traffic scheduling. The first level occurs within the AENs and supports access scheduling with QOS on a user per traffic flow basis. This type of scheduling occurs at rapid rate often on a frame by frame basis. The second level of scheduling allocates backhaul resources to meet capacity bursts in the aggregated traffic to-and-from the AENs. Moreover, scheduling can shift capacity between AENs as needed and/or adjust modulation and coding schemes (MCS) and power levels to minimize interference in the network. Several levels of QOS are also supported on the backhaul links to differentiate between latency critical, guaranteed rate services and best effort flows.

The embodiment of the system supports lower transmission (Tx) power levels and lower EIRP, often 21 dB less when compared to wireless macro-cells. Not only is the power lower, it is more uniformly spread throughout the area of the DC_BTS improving GPS co-existence.

We compute the capacity and coverage of LTE small cells with low Tx power levels and shaped antenna patterns at 1530 MHz adjacent to the GPS frequency band. We then compute the susceptibility of typical GPS receivers operating on adjacent channels and determine that both the GPS and BWA systems can reliability co-exist in the L-band. A graph of EIRP and GPS receiver susceptibility is shown in FIG. 3 to illustrate this point. The specifics of the co-existence calculation show the following details:

The small cell has a cell radius of 110 to 600 meters using the SCM NLOS Walfisch Ikegami microcell model and the SCM LOS Walfisch Ikegami microcell model respectively The small cell and GPS coexist in >99.8% of the cell.
The handset and GPS coexist in >99.7%.
The keep out distances are the order of 10 m.

While the foregoing has been with reference to a particular embodiment of the invention, it will be appreciated by those skilled in the art that changes in this embodiment may be made without departing from the principles and spirit of the disclosure, the scope of which is defined by the appended claims.

The invention claimed is:

1. A distributed capacity base station, comprising:
   a concentrating access node and one or more access end nodes that each communicate with each other terrestrially in a frequency band from 1525 MHz to 1535 MHz adjacent to a global positioning system ("GPS") frequency band centered at 1575 MHz;
   the one or more access end nodes that together provide a lower power and a more uniform power distribution at the frequency band from 1525 MHz to 1535 MHz adjacent the GPS frequency band so that the concentrating access node and one or more access end nodes operate and communicate without interfering with the operation of the GPS, wherein each of the one or more access end nodes have an antenna pattern in which an equivalent isotropically radiated power ("EIRP") is attenuated for depression angles from 45 to 90 degrees.

2. A distributed capacity base station, comprising:
   an access end node and an access concentrating node;
   a radio access node embedded in the base station with the access end node and the access concentrating node that each communicate with each other terrestrially in a frequency band from 1525 MHz to 1535 MHz adjacent to a global positioning system ("GPS") frequency band centered at 1575 MHz, wherein the radio access node one of reduces peak-to-average power, downshifts a modulation and coding scheme and selects a polarization preference to co-exist with the GPS system; and
   wherein the base station has reduced equivalent isotropically radiated power ("EIRP") and shaped elevation antenna patterns at the frequency band from 1525 MHz to 1535 MHz adjacent the GPS frequency band so that the base station operates and communicates without interfering with the operation of the GPS.

3. The base station of claim 2 further comprising a backhaul network connected to the access end node, the backhaul network being one of fiber, copper, laser, microwave radio, millimeter wave radio, a near link-of-sight radio and a non-line-of-sight radio.

4. The base station of claim 2 further comprising a non-line-of-sight radio backhaul network.

5. The base station of claim 2, wherein the shaped elevation antenna pattern is so that the EIRP is attenuated for depression angles from 45 to 90 degrees.

6. A distributed capacity base station, comprising:
   a concentrating access node and one or more access end nodes that each communicate with each other terrestrially in a frequency band from 1525 MHz to 1535 MHz adjacent to a global positioning system ("GPS") frequency band centered at 1575 MHz;
   the one or more access end nodes that together provide a lower power and a more uniform power distribution at the frequency band from 1525 MHz to 1535 MHz adjacent the GPS frequency band so that the concentrating access node and one or more access end nodes operate and communicate without interfering with the operation of the GPS, wherein each of the one or more access end nodes have an in-beam equivalent isotropically radiated power ("EIRP") of a maximum of 42 decibels milliwatts isotropic.

7. A distributed capacity base station, comprising:
an access end node and an access concentrating node;
a radio access node embedded in the base station with the access end node and the access concentrating node that each communicate with each other terrestrially in a frequency band from 1525 MHz to 1535 MHz adjacent to a global positioning system ("GPS") frequency band centered at 1575 MHz; and
wherein the base station has reduced equivalent isotropically radiated power ("EIRP") that is a maximum of 42 decibels milliwatts isotropic and shaped elevation antenna patterns at the frequency band from 1525 MHz to 1535 MHz adjacent the GPS frequency band so that the base station operates and communicates without interfering with the operation of the GPS.

* * * * *